US011157018B2

(12) United States Patent
Colijn et al.

(10) Patent No.: US 11,157,018 B2
(45) Date of Patent: Oct. 26, 2021

(54) FLEET MANAGEMENT FOR AUTONOMOUS VEHICLES

(71) Applicant: Waymo LLC, Mountain View, CA (US)

(72) Inventors: Peter Colijn, San Francisco, CA (US); Laurens Andreas Feenstra, San Francisco, CA (US); Joshua Seth Herbach, San Francisco, CA (US); Katharine Patterson, Palo Alto, CA (US)

(73) Assignee: Waymo LLC, Mountain View, CA (US)

( * ) Notice: Subject to any disclaimer, the term of this patent is extended or adjusted under 35 U.S.C. 154(b) by 45 days.

(21) Appl. No.: 16/719,302

(22) Filed: Dec. 18, 2019

(65) Prior Publication Data
US 2020/0201355 A1 Jun. 25, 2020

Related U.S. Application Data

(63) Continuation of application No. 15/838,650, filed on Dec. 12, 2017, now Pat. No. 10,545,510.

(51) Int. Cl.
G05D 1/02 (2020.01)
G05D 1/00 (2006.01)
(Continued)

(52) U.S. Cl.
CPC ........... *G05D 1/0291* (2013.01); *B60W 30/06* (2013.01); *G05D 1/0088* (2013.01); *G06Q 10/00* (2013.01);
(Continued)

(58) Field of Classification Search
CPC .............. G05D 1/0291; G05D 1/0088; G05D 2201/0213; G08G 1/20; G08G 1/14; B60W 30/06
See application file for complete search history.

(56) References Cited

U.S. PATENT DOCUMENTS

2006/0089863 A1 4/2006 Belleau et al.
2008/0140597 A1 6/2008 Satir et al.
(Continued)

FOREIGN PATENT DOCUMENTS

CN 104648383 A 5/2015
CN 105096636 A 11/2015
(Continued)

OTHER PUBLICATIONS

International Search Report and Written Opinion for Application No. PCT/US2018/059403 dated Mar. 21, 2019.
(Continued)

*Primary Examiner* — Michael J Zanelli
(74) *Attorney, Agent, or Firm* — Botos Churchill IP Law LLP

(57) ABSTRACT

Aspects of the disclosure relate to assigning a fleet of driverless vehicles to a plurality of parking locations for parking vehicles of the fleet. For instance, locations of the vehicles of the fleet as well as a number of available spaces at each of the plurality of parking location locations may be tracked. A subset of the fleet not already located at one of the plurality of parking locations is identified. At least one assignment assigning each vehicle of the subset to a respective parking location of the plurality of parking locations is determined according to the numbers of available spaces and the identified locations of the subset. For the at least one assignment, a total cost is determined by determining a cost value for each of a plurality of factors. The given assignment is sent to the fleet based on the total cost and the cost value.

20 Claims, 13 Drawing Sheets

(51) Int. Cl.
  *B60W 30/06*     (2006.01)
  *G08G 1/14*      (2006.01)
  *G08G 1/00*      (2006.01)
  *G06Q 10/06*     (2012.01)
  *G06Q 10/00*     (2012.01)

(52) U.S. Cl.
  CPC ......... *G06Q 10/06315* (2013.01); *G08G 1/14* (2013.01); *G08G 1/20* (2013.01); *G05D 2201/0213* (2013.01)

(56) References Cited

U.S. PATENT DOCUMENTS

| | | |
|---|---|---|
| 2015/0149023 A1 | 5/2015 | Attard et al. |
| 2015/0241241 A1 | 8/2015 | Cudak et al. |
| 2015/0346727 A1 | 12/2015 | Ramanujam |
| 2016/0048802 A1 | 2/2016 | Luwang et al. |
| 2016/0210590 A1 | 7/2016 | Sugioka et al. |
| 2016/0247106 A1 | 8/2016 | Dalloro et al. |
| 2016/0247247 A1 | 8/2016 | Scicluna |
| 2016/0300186 A1 | 10/2016 | Scharaswak et al. |
| 2017/0118307 A1 | 4/2017 | Beaurepaire et al. |
| 2017/0123421 A1 | 5/2017 | Kentley |
| 2017/0267233 A1 | 9/2017 | Minster et al. |
| 2017/0278312 A1 | 9/2017 | Minster |
| 2017/0323565 A1 | 11/2017 | Nordbruch et al. |
| 2018/0322775 A1 | 11/2018 | Chase et al. |

FOREIGN PATENT DOCUMENTS

| | | |
|---|---|---|
| CN | 105632230 A | 6/2016 |
| CN | 106952496 A | 7/2017 |
| JP | 2005115883 A | 4/2005 |
| JP | 2007310745 A | 11/2007 |
| JP | 2008210249 A | 9/2008 |
| JP | 2011002318 A | 1/2011 |
| JP | 2017142728 A | 8/2017 |
| JP | 2017174208 A | 9/2017 |
| KR | 20160132789 A | 11/2016 |
| WO | 2016079966 A1 | 5/2016 |
| WO | 2017068698 A1 | 4/2017 |

OTHER PUBLICATIONS

Notice of Allowance for Korean Patent Application No. 0-2020-7016812, dated Aug. 13, 2021.
Search Report and Written Opinion for Singapore Patent Application No. 11202004824S, dated Jun. 26, 2021.
Chinese Office Action for Application No. 201880080427.3 dated Apr. 26, 2021.
The Extended European Search Report for European Patent Application No. 18888074.4, dated Aug. 18, 2021.
Notice of Reasons for Rejection for Japanese Patent Application No. 2020-528466 dated Sep. 2, 2021.

| Vehicle ID | Status | Faults | Fault Type | Hours in Service | Hours Since Inspection | Hours Since Calibration | Work Order? | Depot Assignment |
|---|---|---|---|---|---|---|---|---|
| 100 | Available | Yes | 1A | 4 | 4 | 4 | No | No |
| 100A | On trip | No | | 5 | 3 | 3 | No | No |
| 100B | Availible | No | | 2 | 2 | 2 | No | No |

| Depot ID | Available Parking Spots | Depot Operators | Shade | Refueling | Cleaning Services | Maintenance Services | Current Bandwidth |
|---|---|---|---|---|---|---|---|
| 280 | 2 | 2 | Yes | Yes | Yes | Yes | 1 Car/Minute |
| 282 | 1 | 0 | No | No | No | No | N/A |

| Vehicle ID | Status | Faults | Fault Type | Hours in Service | Hours Since Inspection | Hours Since Calibration | Work Order? | Depot Assignment |
|---|---|---|---|---|---|---|---|---|
| 100 | Depot | Yes | 1A | 4 | 4 | 4 | Yes | 280 |
| 100A | On trip | No | | 5 | 3 | 3 | No | No |
| 100B | Available | No | | 2 | 2 | 2 | No | No |

900A
FIGURE 9A

| Depot ID | Available Parking Spots | Depot Operators | Shade | Refueling | Cleaning Services | Maintenance Services | Current Bandwidth |
|---|---|---|---|---|---|---|---|
| 280 | 1 | 2 | Yes | Yes | Yes | Yes | 1 Car/Minute |
| 282 | 1 | 0 | No | No | No | No | N/A |

FLEET MANAGEMENT FOR AUTONOMOUS VEHICLES

CROSS REFERENCE TO RELATED APPLICATIONS

The present application is a continuation of U.S. patent application Ser. No. 15/838,650, filed Dec. 12, 2017, the disclosure of which is incorporated herein by reference.

BACKGROUND

Autonomous vehicles, for instance, vehicles that do not require a human driver, can be used to aid in the transport of passengers or items from one location to another. Such vehicles may operate in a fully autonomous mode where passengers may provide some initial input, such as a pickup or destination location, and the vehicle maneuvers itself to that location. Thus, such vehicles may be used to provide transportation services.

Other systems which provide transportation services typically include drivers or conductors who are tasked with making decisions about how to operate vehicles. Such services may include some backend server systems which can dispatch vehicles to certain locations to provide transportations services as well as provide fleet management and vehicle staging instructions.

BRIEF SUMMARY

One aspect of the disclosure provides a method of assigning a fleet of driverless vehicles to a plurality of parking locations for parking vehicles of the fleet. The method includes identifying, by one or more processors, locations of the vehicles of the fleet; identifying, by the one or more processors, a number of available spaces at each of the plurality of parking locations; identifying, by the one or more processors, a subset of the vehicles of the fleet not already located at one of the plurality of parking locations; determining, by the one or more processors, at least one assignment assigning each vehicle of the subset to a respective assigned parking location of the plurality of parking locations based on the numbers of available spaces and the identified locations of the subset; determining, by the one or more processors, a total cost for the at least one assignment by determining a cost value for each of a plurality of factors including how quickly the vehicles of the subset are able to reach the respective assigned parking locations; and sending, by the one or more processors, the at least one assignment to the fleet based on the total cost.

In one example, the method also includes sending an instruction to the fleet, after sending the at least one assignment, thereby causing all vehicles of the subset to travel to a corresponding respective assigned parking location according to the at least one assignment. In another example, the plurality of factors include how long it takes all of the vehicles of the subset to park at assigned parking locations. In another example, the plurality of factors include a number of spaces available at each parking location of the plurality of parking locations. In another example, the plurality of factors include whether any vehicles of the subset will reach a given parking location at a rate which is greater than an intake bandwidth of the given parking location. In another example, the plurality of factors include whether sending the subset to respective assigned parking locations will cause traffic congestion concerns. In this example, determining a cost value for the factor of sending the subset to assigned parking locations will cause traffic congestion for the at least one assignment includes determining a route for each vehicle of the subset to reach a respective assigned parking location according to the at least one assignment; for each route, determining a plurality of segments; and for each of the plurality of segments, identifying a number of vehicles of the subset which will traverse the segment, wherein the cost value for the factor of sending the subset to respective assigned parking locations will cause traffic congestion for the at least one assignment is based on the number of vehicles for each of the plurality of segments.

In another example, the method also includes receiving from each vehicle of the fleet a periodic broadcast identifying a status of the vehicle; identifying a first vehicle of the fleet in need of service based on the periodic broadcast received from the first vehicle; assigning the first vehicle to a first parking location of the plurality of parking locations; and after assigning the first vehicle, removing the first vehicle from the subset. In this example, the periodic broadcast received from the first vehicle identifies a service need of the first vehicle, and wherein each location of the plurality of parking locations is associated with a set of service capabilities, and wherein the first vehicle is assigned to the first parking location based on the service need and the set of service capabilities of the first location. In addition or alternatively, the method also includes, after assigning the first vehicle to the first location, adjusting the number of available parking spaces at the first location. In another example, the method also includes, sending a set of navigation instruction for each vehicle of the subset to maneuver to a corresponding respective assigned parking location according to the at least one assignment.

In another example, the method also includes determining, by the one or more processors, a plurality of assignments, for assigning each vehicle of the subset to a respective assigned parking location of the plurality of parking locations based on according to the numbers of available spaces and the identified locations of the vehicles of the fleet, and for each assignment of the plurality of assignments, determining a total cost using the plurality of factors including how quickly vehicles of the subset are able to reach the respective assigned parking locations, and wherein sending the at least one assignment includes selecting, by the one or more processors, the at least one assignment based on the deter lined total costs for the plurality of assignments and the total cost for the at least one assignment, and sending the at least one assignment is further based on the selecting. In this example, the selecting is further based on the total cost for the at least one assignment being lower than all of the total costs for the plurality of assignments.

In another example, sending the at least one assignment is further based on the total cost meeting a threshold value. In another example, the method also includes determining a restriction rule for at least a second subset of the fleet and broadcasting the restriction rule to the fleet with instructions for each given vehicle of the fleet to determine whether the restriction rule applies to that given vehicle. In this example, the restriction rule restricts highway driving of the second subset. In addition or alternatively, the restriction rule restricts driving of the second subset on roads having speed limits above a speed limit defined in the restriction rule.

Another aspect of the disclosure provides a system for assigning a fleet of driverless vehicles to a plurality of parking locations for parking vehicles of the fleet. The system includes one or more processors configured to: identify locations of the vehicles of the fleet; identify a number of available spaces at each of the plurality of parking locations; identify a subset of the vehicles of the fleet not already located at one of the plurality of locations; determine at least one assignment assigning each vehicle of the subset to a respective assigned parking location of the plurality of parking locations based on the numbers of available spaces and the identified locations of the subset; determine a total cost for the at least one assignment by determining a cost value for each of a plurality of factors including how quickly vehicles of the subset are able to reach the respective assigned locations; and send the at least one assignment to the fleet based on the total cost.

In one example, the one or more processors are further configured to send an instruction to the fleet, after sending the assignment, thereby causing all vehicles of the subset to travel to a respective assigned location according to the at least one assignment. In another example, the system also includes the fleet.

BRIEF DESCRIPTION OF THE DRAWINGS

FIGS. 8A-8B are example tables in accordance with aspects of the disclosure.

FIGS. 9A-9B are example tables in accordance with aspects of the disclosure.

DETAILED DESCRIPTION

Overview

Figure 1:
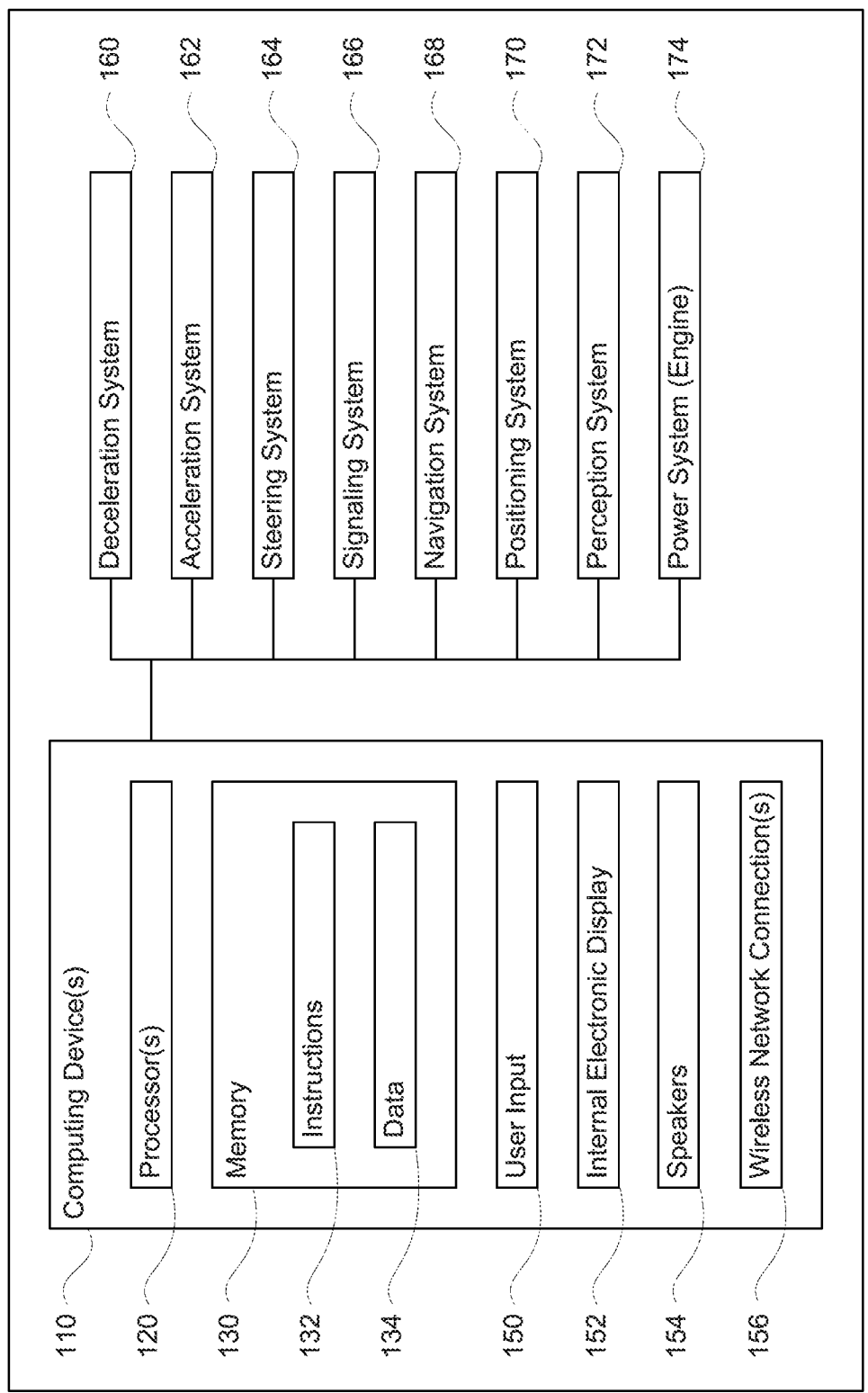
FIG. 1 is a functional diagram of an example vehicle in accordance with an exemplary embodiment.

The technology relates to systems for determining how to distribute a fleet of autonomous vehicles. For instances, unlike with typical vehicle transportation services which include drivers and/or set schedules (in the case of busses or trains), a fleet of autonomous vehicles, which may provide transportation services for moving passengers or cargo, must be able to respond to situations in which the fleet of vehicles is grounded or needs to be removed from public roadways in the event of an emergency or other such situation. For instance, this may become necessary in the event of inclement weather, discovery of certain software or hardware errors, an unexplained collision, etc.

To do so in an effective way, it must be determined when and how such vehicles should return to a parking location, for example for service, or in the event of a grounding of the fleet. These parking locations may have different characteristics, such as availability, intake bandwidth, services available, etc. Accordingly, as the number of vehicles in the fleet and parking locations with different characteristics increase, determining how to distribute the vehicles to these parking locations can become very complex very quickly.

The parking locations may be fixed locations which include parking areas or spaces for the vehicles. Each parking location therefor has a predetermined number of parking spots. For instance, parking locations may include open areas, parking lots, or buildings such as parking decks, warehouses, carports, or other structures suitable for parking vehicles such as stack parking systems, etc. All or some of these parking locations may also have specific features such as shade, refueling or charging stations, cleaning services, and maintenance services or may simply be a "staging pad" or a location where a vehicle is able to park and wait to be assigned to a trip. As noted above, the parking locations may have a certain bandwidth for accepting vehicles that is dependent upon the number of available human operators who are able to "take in" at any given time.

A backend dispatching server system (dispatching system) may be in communication with both the parking locations and the vehicles. The backend system may also track the locations of vehicles and the status of the parking locations, including the number of available spots.

As the vehicles of the fleet drive around, they may constantly broadcast to the dispatching system their status. When a vehicle is empty of passengers, the dispatching system may use this information to assign the vehicle to the closest parking location available which meets the needs of that vehicle. As such, the backend system may update the number of available spaces at the assigned parking location to include one less. This process may be performed for any vehicles requiring maintenance and assigned parking locations.

At the same time, for all other vehicles of the fleet not already dispatched to a particular parking location or already at a parking location, the dispatching system may determine where those vehicles should go in the event the fleet is grounded. In this instance, the dispatching system may take into account a number of different factors. Each factor may be assigned a cost.

The dispatching system may iterate through different arrangements of vehicles, and each iteration may be associated with an overall or total cost. The iterations may be differentiated by adjusting the assignments for one or more vehicles which contributed the greatest costs to the overall costs of the previous iteration. The iterations may continue until the costs can no longer be reduced (i.e. the next iteration increases the overall cost) or until a threshold value is met.

The iteration associated with the lowest total cost or the first iteration to meet the threshold value may be selected and used to assign the vehicles to the parking locations. These assignments may then be broadcast to all vehicles in the fleet or sent as individual instructions to each vehicle. In some instances, the assignments may include a set of directions (navigation instructions) for the vehicles to reach the assigned parking locations. In addition, the assignment of vehicles may be performed periodically and new parking location locations set to each vehicle in the fleet. As an example, this may be several times per second or more or less.

In addition to assigning vehicles to parking locations, the dispatching system may also set rules or requirements for the entire fleet or for specific vehicles. The responses or behaviors that should apply to these requirements may vary based on the proscribed situation. While the requirements may be sent to only the vehicles which would be subject to those requirements, alternatively, the requirements may be sent to all vehicles in the fleet. In this way, each individual vehicle's computing devices may be tasked with determining whether the requirements apply to that vehicle.

In some instances, the dispatching system may also control the number of vehicles in service. This may be done according to expected or actual demand for the vehicles of the fleet, as well as any of the features described above. For instance, the dispatching system may send certain vehicles to specific locations to wait when demand is or is expected to be high in the area, etc.

The features described herein allow for a dispatching system to efficiently and continuously address individual needs of vehicles within a fleet while at the same time predicting the most efficient and safest way to address changing conditions and "ground" the fleet in an emergency, while at the same time, continuously optimizing the vehicle supply for a ride-hailing service.

Example Systems

As shown in FIG. 1, a vehicle 100 in accordance with one aspect of the disclosure includes various components. While certain aspects of the disclosure are particularly useful in connection with specific types of vehicles, the vehicle may be any type of vehicle including, but not limited to, cars, trucks, motorcycles, buses, recreational vehicles, etc. The vehicle may have one or more computing devices, such as computing devices 110 containing one or more processors 120, memory 130 and other components typically present in general purpose computing devices.

The memory 130 stores information accessible by the one or more processors 120, including instructions 134 and data 132 that may be executed or otherwise used by the processor 120. The memory 130 may be of any type capable of storing information accessible by the processor, including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 134 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The data 132 may be retrieved, stored or modified by processor 120 in accordance with the instructions 134. For instance, although the claimed subject matter is not limited by any particular data structure, the data may be stored in computing device registers, in a relational database as a table having a plurality of different fields and records, XML documents or flat files. The data may also be formatted in any computing device-readable format.

The one or more processor 120 may be any conventional processors, such as commercially available CPUs. Alternatively, the one or more processors may be a dedicated device such as an ASIC or other hardware-based processor. Although FIG. 1 functionally illustrates the processor, memory, and other elements of computing devices 110 as being within the same block, it will be understood by those of ordinary skill in the art that the processor, computing device, or memory may actually include multiple processors, computing devices, or memories that may or may not be stored within the same physical housing. For example, memory may be a hard drive or other storage media located in a housing different from that of computing devices 110. Accordingly, references to a processor or computing device will be understood to include references to a collection of processors or computing devices or memories that may or may not operate in parallel.

Computing devices 110 may all of the components normally used in connection with a computing device such as the processor and memory described above as well as a user input 150 (e.g., a mouse, keyboard, touch screen and/or microphone) and various electronic displays (e.g., a monitor having a screen or any other electrical device that is operable to display information). In this example, the vehicle includes an internal electronic display 152 as well as one or more speakers 154 to provide information or audio visual experiences. In this regard, internal electronic display 152 may be located within a cabin of vehicle 100 and may be used by computing devices 110 to provide information to passengers within the vehicle 100.

Computing devices 110 may also include one or more wireless network connections 156 to facilitate communication with other computing devices, such as the client computing devices and server computing devices described in detail below. The wireless network connections may include short range communication protocols such as Bluetooth, Bluetooth low energy (LE), cellular connections, as well as various configurations and protocols including the Internet, World Wide Web, intranets, virtual private networks, wide area networks, local networks, private networks using communication protocols proprietary to one or more companies, Ethernet, WiFi and HTTP, and various combinations of the foregoing.

In one example, computing devices 110 may be control computing devices of an autonomous driving computing system or incorporated into vehicle 100. The autonomous driving computing system may capable of communicating with various components of the vehicle in order to control the movement of vehicle 100 according to primary vehicle control code of memory 130. For example, returning to FIG. 1, computing devices 110 may be in communication with various systems of vehicle 100, such as deceleration system 160, acceleration system 162, steering system 164, signaling system 166, navigation system 168, positioning system 170, perception system 172, and power system 174 (i.e. the vehicle's engine or motor) in order to control the movement, speed, etc. of vehicle 100 in accordance with the instructions 134 of memory 130. Again, although these systems are shown as external to computing devices 110, in actuality, these systems may also be incorporated into computing devices 110, again as an autonomous driving computing system for controlling vehicle 100.

As an example, computing devices 110 may interact with one or more actuators of the deceleration system 160 and/or acceleration system 162, such as brakes, accelerator pedal, and/or the engine or motor of the vehicle, in order to control the speed of the vehicle. Similarly, one or more actuators of the steering system 164, such as a steering wheel, steering shaft, and/or pinion and rack in a rack and pinion system, may be used by computing devices 110 in order to control the direction of vehicle 100. For example, if vehicle 100 is configured for use on a road, such as a car or truck, the steering system may include one or more actuators to control the angle of wheels to turn the vehicle. Signaling system 166 may be used by computing devices 110 in order to signal the vehicle's intent to other drivers or vehicles, for example, by lighting turn signals or brake lights when needed.

Navigation system 168 may be used by computing devices 110 in order to determine and follow a route to a location. In this regard, the navigation system 168 and/or data 132 may store detailed map information, e.g., highly detailed maps identifying the shape and elevation of roadways, lane lines, intersections, crosswalks, speed limits, traffic signals, buildings, signs, real time traffic information, vegetation, or other such objects and information.

Figure 2:
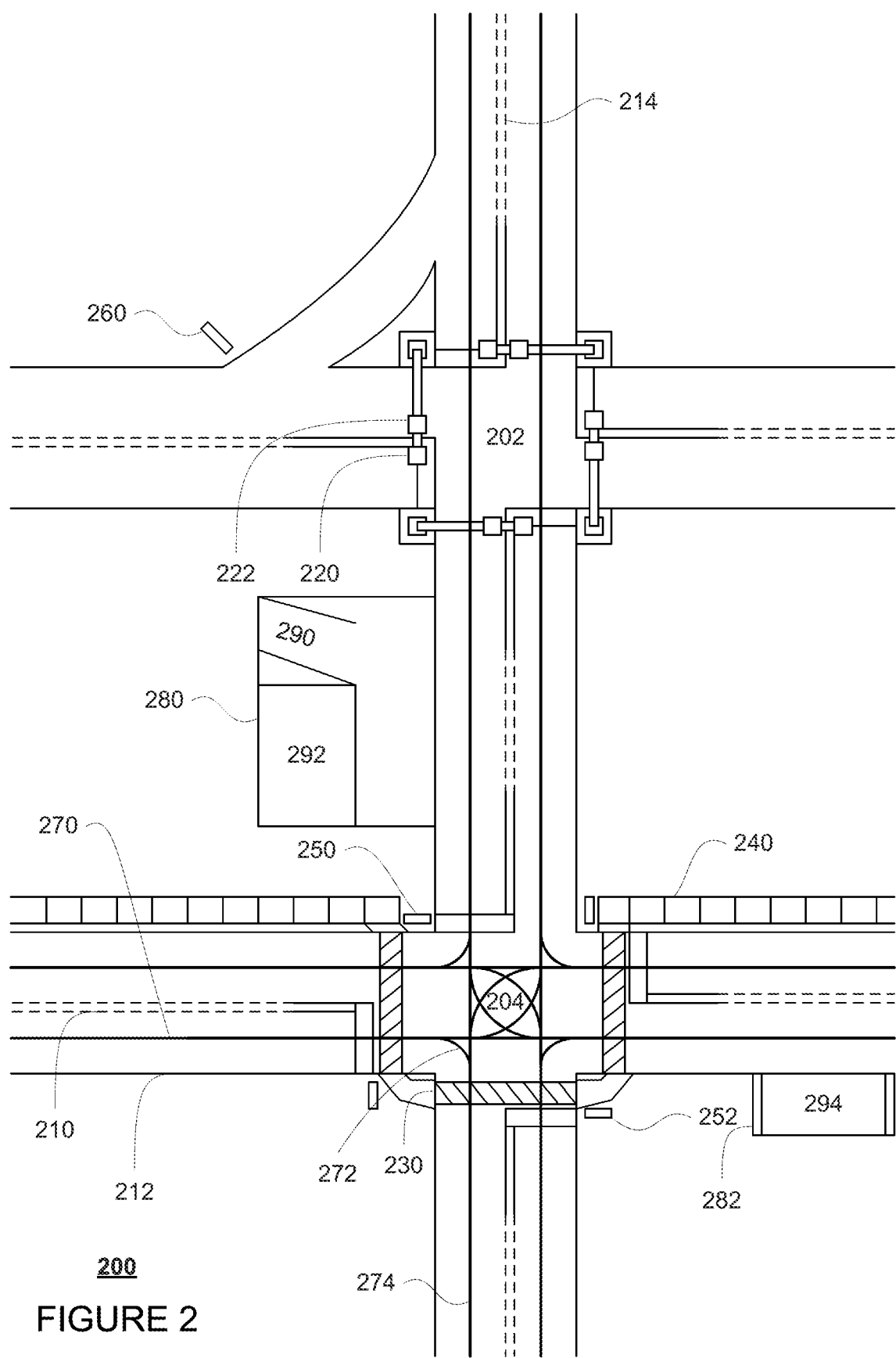
FIG. 2 is an example of map information in accordance with aspects of the disclosure.

FIG. 2 is an example of map information 200 for a section of roadway including intersections 202 and 204. In this example, the map information 200 includes information identifying the shape, location, and other characteristics of lane lines 210, 212, 214, traffic signal lights 220, 222, crosswalk 230, sidewalks 240, stop signs 250, 252, and yield sign 260. Areas where the vehicle can drive may be associated with one or more rails 270, 272, and 274 which indicate the location and direction in which a vehicle should generally travel at various locations in the map information. For example, a vehicle may follow rail 270 when driving in the lane between lane lines 210 and 212, and may transition to rail 272 in order to make a right turn at intersection 204. Thereafter the vehicle may follow rail 274. Of course, given the number and nature of the rails only a few are depicted in map information 200 for simplicity and ease of understanding.

In addition to the features discussed above, the map information may also identify the location and characteristics of parking locations. parking locations may be fixed locations which include parking areas or spaces for the vehicles. Each parking location may have a predetermined number of parking spots. In addition, some parking locations may have features such as shade (to keep vehicles and sensors cool between trips), refueling or charging stations, cleaning services, and maintenance services. In this regard, the map information identifies parking locations 280, 282 as well as parking spaces 290-294.

Some parking locations may allow for vehicles to park and wait for longer periods, for instance, to turn all of the way off in order to avoid use of fuel or power, or shorter periods where the vehicles are very much "in service" but are not assigned to a passenger or trip. For instance, spot 290 may provide shade, while spot 292 may include maintenance features for refueling, inspecting, or other maintenance work.

Other parking locations may simply be "staging pads" or locations where one or more vehicles can park and wait to be assigned passengers. These staging pad locations are preferably located proximate to high passenger areas, such as shopping malls, train stations, stadiums, etc. In this regard, spot 294 of parking location 282 may be a staging pad location which allows the vehicle to easily reach a high demand area nearby.

Although the map information is depicted herein as an image-based map, the map information need not be entirely image based (for example, raster). For example, the map information may include one or more roadgraphs or graph networks of information such as roads, lanes, intersections, and the connections between these features. Each feature may be stored as graph data and may be associated with information such as a geographic location and whether or not it is linked to other related features, for example, a stop sign may be linked to a road and an intersection, etc. In some examples, the associated data may include grid-based indices of a roadgraph to allow for efficient lookup of certain roadgraph features.

Positioning system 170 may be used by computing devices 110 in order to determine the vehicle's relative or absolute position on a map or on the earth. For example, the position system 170 may include a GPS receiver to determine the device's latitude, longitude and/or altitude position. Other location systems such as laser-based localization systems, inertial-aided GPS, or camera-based localization may also be used to identify the location of the vehicle. The location of the vehicle may include an absolute geographical location, such as latitude, longitude, and altitude as well as relative location information, such as location relative to other cars immediately around it which can often be determined with less noise that absolute geographical location.

The positioning system 170 may also include other devices in communication with computing devices 110, such as an accelerometer, gyroscope or another direction/speed detection device to determine the direction and speed of the vehicle or changes thereto. By way of example only, an acceleration device may determine its pitch, yaw or roll (or changes thereto) relative to the direction of gravity or a plane perpendicular thereto. The device may also track increases or decreases in speed and the direction of such changes. The device's provision of location and orientation data as set forth herein may be provided automatically to the computing devices 110, other computing devices and combinations of the foregoing.

Figure 3:
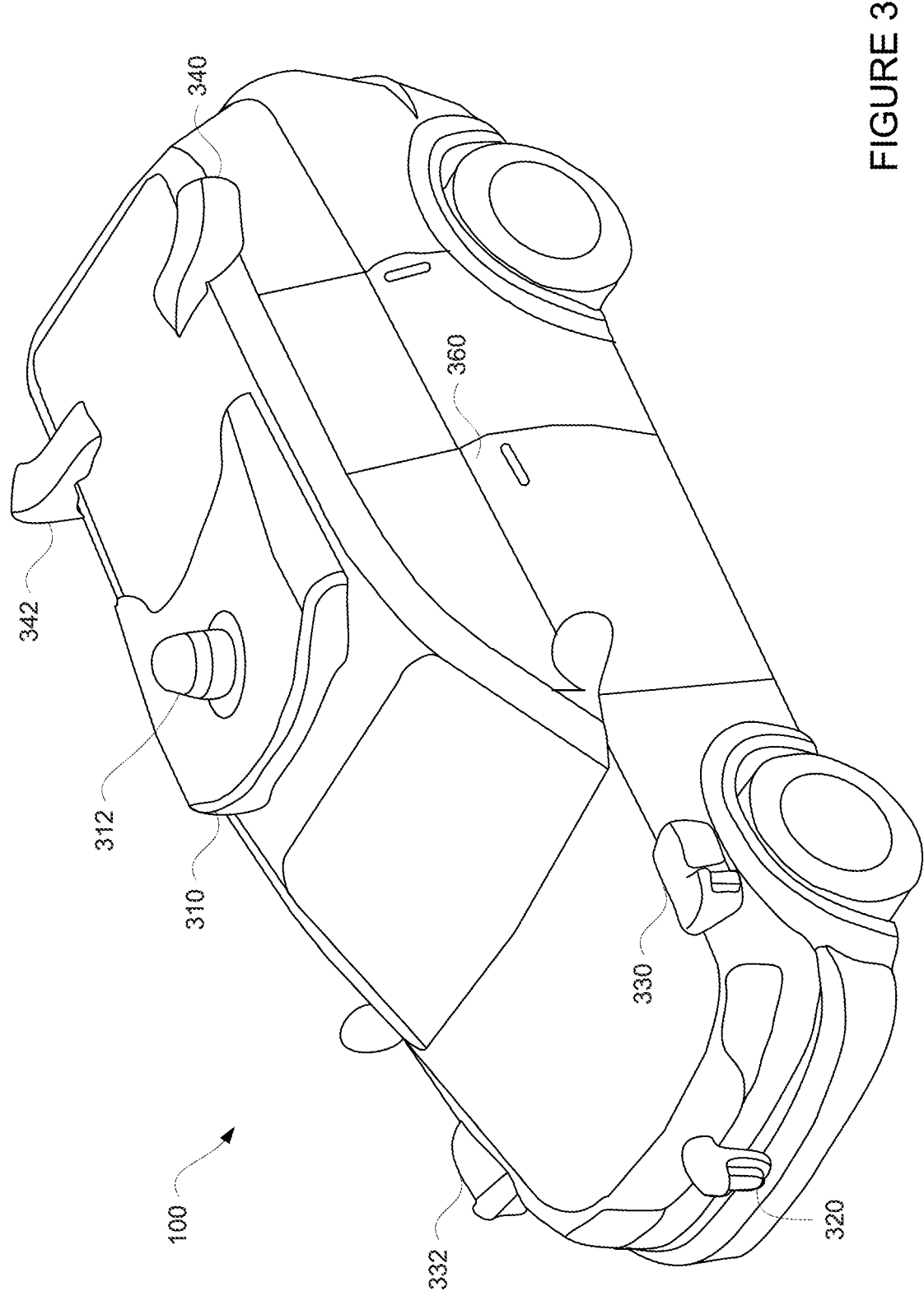
FIG. 3 is an example external view of a vehicle in accordance with aspects of the disclosure.

The perception system 172 also includes one or more components for detecting objects external to the vehicle such as other vehicles, obstacles in the roadway, traffic signals, signs, trees, etc. For example, the perception system 172 may include lasers, sonar, radar, cameras and/or any other detection devices that record data which may be processed by computing device 110. In the case where the vehicle is a passenger vehicle such as a minivan, the minivan may include a laser or other sensors mounted on the roof or other convenient location. For instance, FIG. 3 is an example external view of vehicle 100. In this example, roof-top housing 310 and dome housing 312 may include a lidar sensor as well as various cameras and radar units. In addition, housing 320 located at the front end of vehicle 100 and housings 330, 332 on the driver's and passenger's sides of the vehicle may each store a lidar sensor. For example, housing 330 is located in front of driver door 360. Vehicle 100 also includes housings 340, 342 for radar units and/or cameras also located on the roof of vehicle 100. Additional radar units and cameras (not shown) may be located at the front and rear ends of vehicle 100 and/or on other positions along the roof or roof-top housing 310.

The computing devices 110 may control the direction and speed of the vehicle by controlling various components. By way of example, computing devices 110 may navigate the vehicle to a destination location completely autonomously using data from the detailed map information and navigation system 168. Computing devices 110 may use the positioning system 170 to determine the vehicle's location and perception system 172 to detect and respond to objects when needed to reach the location safely. In order to do so, computing devices 110 may cause the vehicle to accelerate (e.g., by increasing fuel or other energy provided to the engine by acceleration system 162), decelerate (e.g., by decreasing the fuel supplied to the engine, changing gears, and/or by applying brakes by deceleration system 160), change direction (e.g., by turning the front or rear wheels of vehicle 100 by steering system 164), and signal such changes by lighting turn signals of signaling system 166). Thus, the acceleration system 162 and deceleration system 160 may be a part of a drivetrain that includes various components between an engine of the vehicle and the wheels of the vehicle. Again, by controlling these systems, computing devices 110 may also control the drivetrain of the vehicle in order to maneuver the vehicle autonomously.

Figure 4:
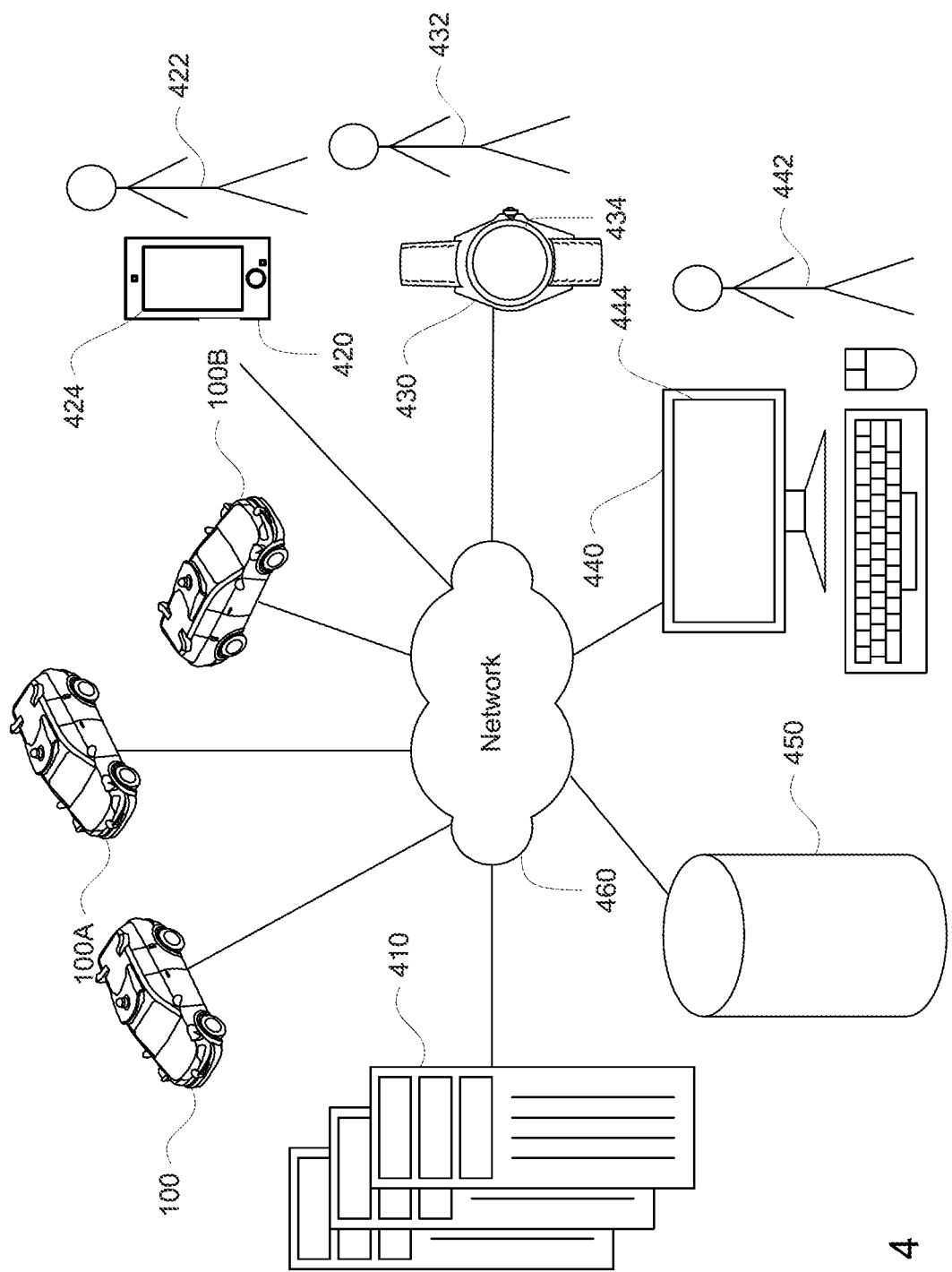
FIG. 4 is a pictorial diagram of an example system in accordance with an exemplary embodiment.
Figure 5:
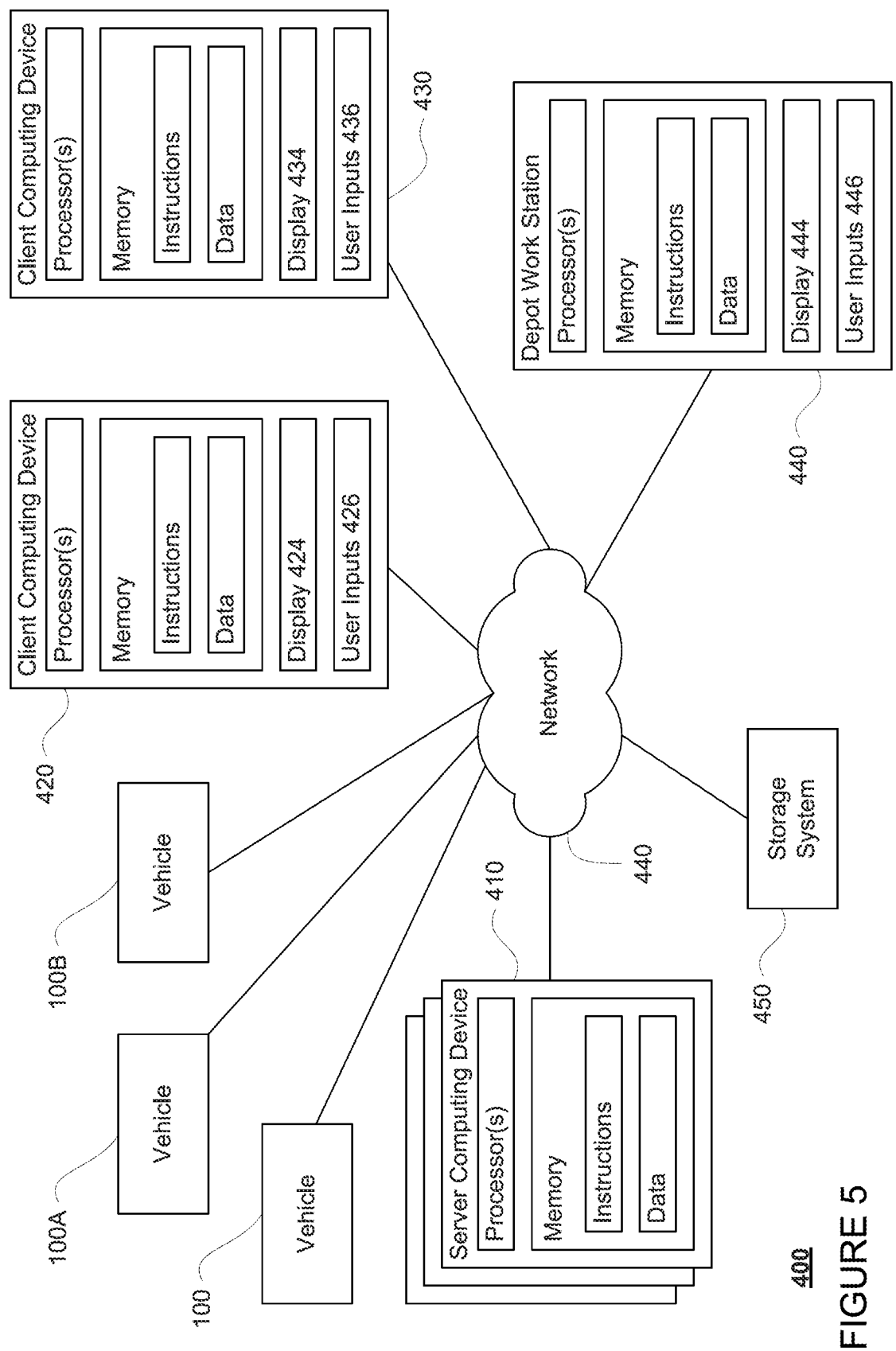
FIG. 5 is a functional diagram of the system of FIG. 4 in accordance with aspects of the disclosure.

Computing device 110 of vehicle 100 may also receive or transfer information to and from other computing devices, such as those computing devices that are a part of the transportation service as well as other computing devices. FIGS. 4 and 5 are pictorial and functional diagrams, respectively, of an example system 400 that includes a plurality of computing devices 410, 420, 430, 440 and a storage system 450 connected via a network 460. System 400 also includes vehicle 100, and vehicles 100A, 100B which may be configured the same as or similarly to vehicle 100. Although only a few vehicles and computing devices are depicted for simplicity, a typical system may include significantly more.

As shown in FIG. 4, each of computing devices 410, 420, 430, 440 may include one or more processors, memory, data and instructions. Such processors, memories, data and instructions may be configured similarly to one or more processors 120, memory 130, data 132, and instructions 134 of computing device 110.

The network 460, and intervening nodes, may include various configurations and protocols including short range communication protocols such as Bluetooth, Bluetooth LE, the Internet, World Wide Web, intranets, virtual private networks, wide area networks, local networks, private networks using communication protocols proprietary to one or more companies. Ethernet, WiFi and HTTP, and various combinations of the foregoing. Such communication may be facilitated by any device capable of transmitting data to and from other computing devices, such as modems and wireless interfaces.

In one example, one or more computing devices 110 may include one or more server computing devices having a plurality of computing devices, e.g., a load balanced server farm, that exchange information with different nodes of a network for the purpose of receiving, processing and transmitting the data to and from other computing devices. For instance, one or more computing devices 410 may include one or more server computing devices that are capable of communicating with computing device 110 of vehicle 100 or a similar computing device of vehicle 100A, 100B as well as computing devices 420, 430, 440 via the network 460. For example, vehicles 100, 100A, 100B may be a part of a fleet of vehicles that can be dispatched by server computing devices to various locations. In this regard, the server computing devices 410 may function as a dispatching system. In addition, the vehicles of the fleet may periodically send the server computing devices location information provided by the vehicle's respective positioning systems as well as other information relating to the status of the vehicles discussed further below, and the one or more server computing devices may track the locations and status of each of the vehicles of the fleet.

In addition, server computing devices 410 may use network 460 to transmit and present information to a user, such as user 422, 432, 442 on a display, such as displays 424, 434, 444 of computing devices 420, 430, 440. In this regard, computing devices 420, 430, 440 may be considered client computing devices.

As shown in FIG. 4, each client computing device 420, 430, 440 may be a personal computing device intended for use by a user 422, 432, 442, and have all of the components normally used in connection with a personal computing device including a one or more processors (e.g., a central processing unit (CPU)), memory (e.g., RAM and internal hard drives) storing data and instructions, a display such as displays 424, 434, 444 (e.g., a monitor having a screen, a touch-screen, a projector, a television, or other device that is operable to display information), and user input devices 426, 436, 446 (e.g., a mouse, keyboard, touchscreen or microphone). The client computing devices may also include a camera for recording video streams, speakers, a network interface device, and all of the components used for connecting these elements to one another.

Although the client computing devices 420, 430, and 440 may each comprise a full-sized personal computing device, they may alternatively comprise mobile computing devices capable of wirelessly exchanging data with a server over a network such as the Internet. By way of example only, client computing device 420 may be a mobile phone or a device such as a wireless-enabled PDA, a tablet PC, a wearable computing device or system, or a netbook that is capable of obtaining information via the Internet or other networks. In another example, client computing device 430 may be a wearable computing system, shown as a wristwatch as shown in FIG. 4. As an example the user may input information using a small keyboard, a keypad, microphone, using visual signals with a camera, or a touch screen.

In some examples, client computing device 440 may be a concierge work station used by an administrator or operator of a parking location to provide parking location services for the vehicles of the fleet. For example, user 442 may be a parking location operator who uses the parking location work station 440 to receive "work orders" generated by the dispatching system 410, as discussed further below, and/or perform various maintenance services and communication operations for the vehicle of the fleet. In this regard, the parking location work station 440 may be located at parking location 280, whereas parking location 282 may not need a parking location work station as such services are not available at parking location 282. Although only a single parking location work station 440 is shown in FIGS. 4 and 5, any number of such work stations may be included in a typical system.

As with memory 130, storage system 450 can be of any type of computerized storage capable of storing information accessible by the server computing devices 410, such as a hard-drive, memory card, ROM, RAM, DVD, CD-ROM, write-capable, and read-only memories. In addition, storage system 450 may include a distributed storage system where data is stored on a plurality of different storage devices which may be physically located at the same or different geographic locations. Storage system 450 may be connected to the computing devices via the network 460 as shown in FIGS. 4 and 5, and/or may be directly connected to or incorporated into any of the computing devices 110, 410, 420, 430, 440, etc.

Storage system 450 may store various types of information as described in more detail below. This information may be retrieved or otherwise accessed by a server computing device, such as one or more server computing devices 410, in order to perform some or all of the features described herein. As an example, the information of storage system 450 may include the status and characteristics of each vehicle of the fleet and parking locations, as discussed above, as well as the map information discussed above.

For instance, as the vehicles of the fleet drive around, they may constantly and/or periodically broadcast to the dispatching system 410 their status. This may include, for example, whether the vehicle needs cooling or shade, refueling or charging, cleaning, periodic inspection (after so many hours, trips, or miles in service), recalibration of sensors (to address faults or periodic maintenance), or other maintenance. The dispatching system 410 may store and/or this information in storage system 450. As discussed further below, FIG. 8A is an example table for tracking the status of the vehicles of the fleet.

In addition, the dispatching system may use this information to assign the vehicle to the closest parking location available which meets the needs of that vehicle. In this regard, the dispatching system 410 may create a work order to be sent to a parking location work station for a given parking location to inform the parking location operators at the parking location of the needs of the vehicle. The work orders and the corresponding status may also be stored and/or updated in the storage system 450 as needed.

As noted above, in addition to the location and number of spots, the information of storage system 450 may include the characteristics of the parking locations. This may include whether a parking location can provide shade, wireless network access (for instance, such as WiFi (R)), refueling or charging stations, cleaning services, and maintenance services. In addition, the information of storage system 450 may include a staffing (for instance, the number of parking location operators on duty), bandwidth (which may relate to staffing or the number of vehicles it could store at any one time), as well as reachability details. For instance, as noted above, the parking locations may have a certain bandwidth for accepting vehicles that is dependent upon the number of available human operators who are able to "take in" (for instance, inspect, park, etc.) at any given time. For instance, the bandwidth of parking location 280 may be 1 vehicle per minute, while parking location 282 may not actually have a bandwidth, since parking location 282 is actually a staging pad location and no parking location operators are needed to take in vehicles at that location. In addition, it may take longer to reach (due to congestion or other limitations on the streets leading to the parking location, etc.) and park at some parking locations than others. As discussed further below, FIG. 8B is an example table for tracking the status of the vehicles of the fleet.

In order to provide transportation services to users, the information of storage system 450 may include user account information such as credentials (e.g., a username and password as in the case of a traditional single-factor authentication as well as other types of credentials typically used in multi-factor authentications such as random identifiers, biometrics, etc.) that can be used to identify a user to the one or more server computing devices. The user account information may also include personal information such as the user's name, contact information, identifying information of the user's client computing device (or devices if multiple devices are used with the same user account), one or more unique signals for the user as well as other user preference or settings data. The settings data may include settings which would indicate that the passenger requests assistance locating and/or identifying a vehicle. Such settings may include an "audio communication aid" or "hearing impaired" setting. These settings may be available to all users of the vehicle services described herein, including those with or without vision impairments. In addition, although the examples described herein discuss providing audible cues and other information on the basis of a user or passenger's settings, the audible cues may be provided as discussed herein for all passengers, regardless of such settings.

The storage system 450 may also store information which can be provided to client computing devices for display to a user. For instance, the storage system 450 may store predetermined distance information for determining an area at which a vehicle is likely to stop for a given pickup or destination location. The storage system 450 may also store graphics, icons, and other items which may be displayed to a user as discussed below.

Example Methods

In addition to the operations described above and illustrated in the figures, various operations will now be described. It should be understood that the following operations do not have to be performed in the precise order described below. Rather, various steps can be handled in a different order or simultaneously, and steps may also be added or omitted.

In one aspect, a user may download an application for requesting transportation services, or rather a vehicle, to a client computing device. For example, users 422 and 432 may download the application via a link in an email, directly from a website, or an application store to client computing devices 420 and 430. For example, client computing device may transmit a request for the application over the network, for example, to one or more server computing devices 110, and in response, receive the application. The application may be installed locally at the client computing device.

The user may then use his or her client computing device to access the application and request a vehicle. As an example, a user such as user 432 may use client computing device 430 to send a request to one or more server computing devices 410 for a vehicle. As part of this, the user may identify a pickup location, a destination location, and, in some cases, one or more intermediate stopping locations anywhere within a service area where a vehicle can stop.

As noted above, the vehicles of the fleet drive around, they may constantly report to the dispatching system their status. For instance, each vehicle's positioning system 170 may provide the vehicle's computing device 110 with the vehicle's location and position. The computing devices 110 may then send this information to the dispatching system 410. In addition to the vehicle's location, the different systems of the vehicle may also send information to the computing devices 110. This may include, for example, whether the vehicle needs cooling or shade, refueling or charging, cleaning, periodic inspection (after so many hours, trips, or miles in service), recalibration of sensors (to address faults or periodic maintenance), or other maintenance. This may also be sent to the dispatching system 410.

Figure 6:
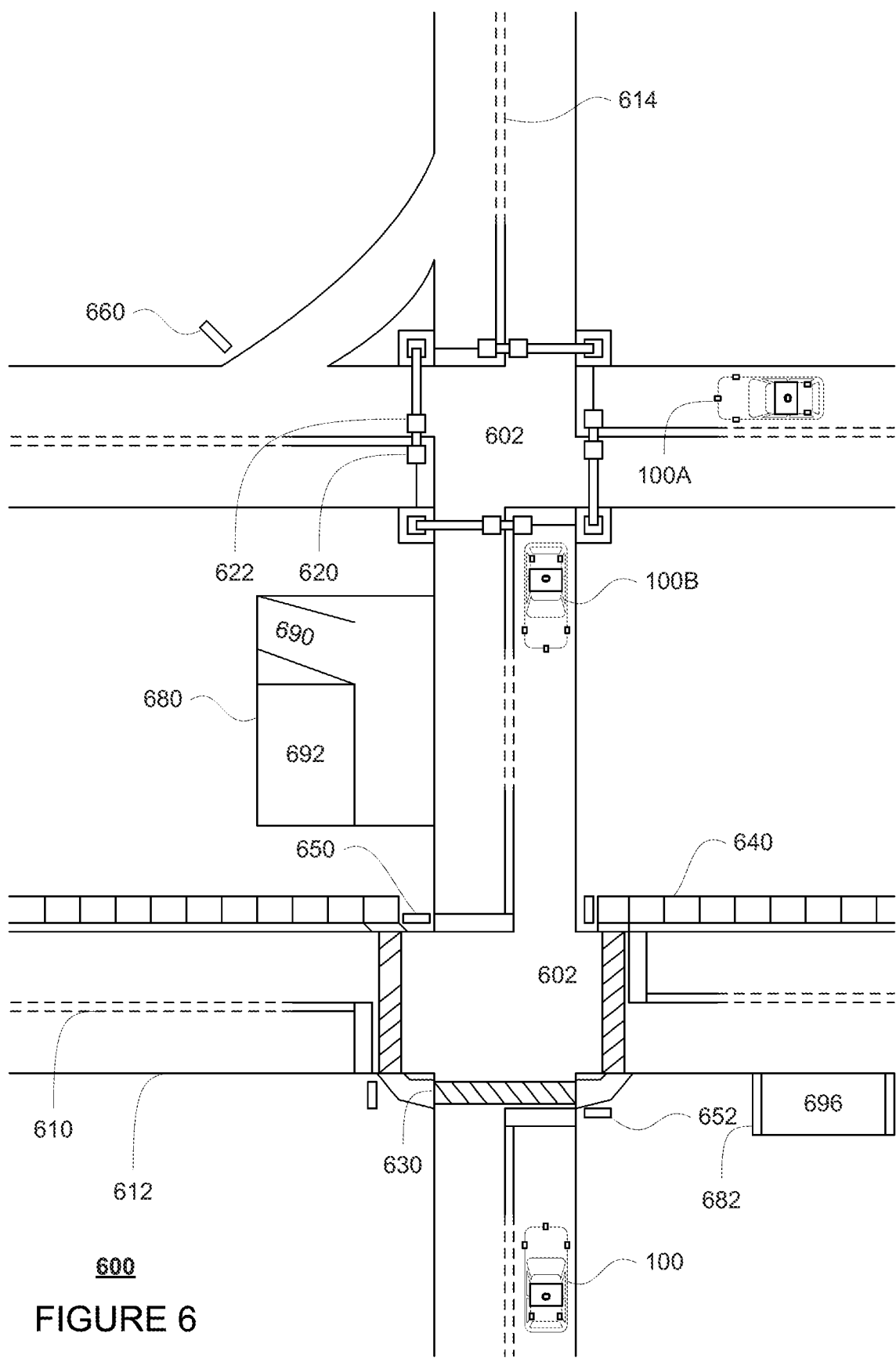
FIG. 6 is an example bird's eye view of a geographic area in accordance with aspects of the disclosure.

As noted above, the dispatching system 410 may receive the status reports and track the status of each vehicle in storage system 450. For instance, FIG. 6 depicts vehicles 100, 100A, and 110B being maneuvered on a section of roadway 600 including intersections 602 and 604. In example of FIG. 6, intersections 602 and 604 correspond to intersections 202 and 204 of the map information 200, respectively. In this example, lane lines 610, 612, and 614 correspond to the shape, location, and other characteristics of lane lines 210, 212, and 214, respectively. Similarly, crosswalk 630 corresponds to the shape, location, and other characteristics of crosswalk 230, respectively; sidewalks 640 correspond to sidewalks 240; traffic signal lights 620, 622 correspond to traffic signal lights 220, 222, respectively; stop signs 650, 652 correspond to stop signs 250, 252, respectively; and yield sign 660 corresponds to yield sign 260. In addition, parking locations 680, 682 correspond to parking locations 280, 282, and parking spaces 690, 692 correspond to parking spaces 290-294.

Figure 7:
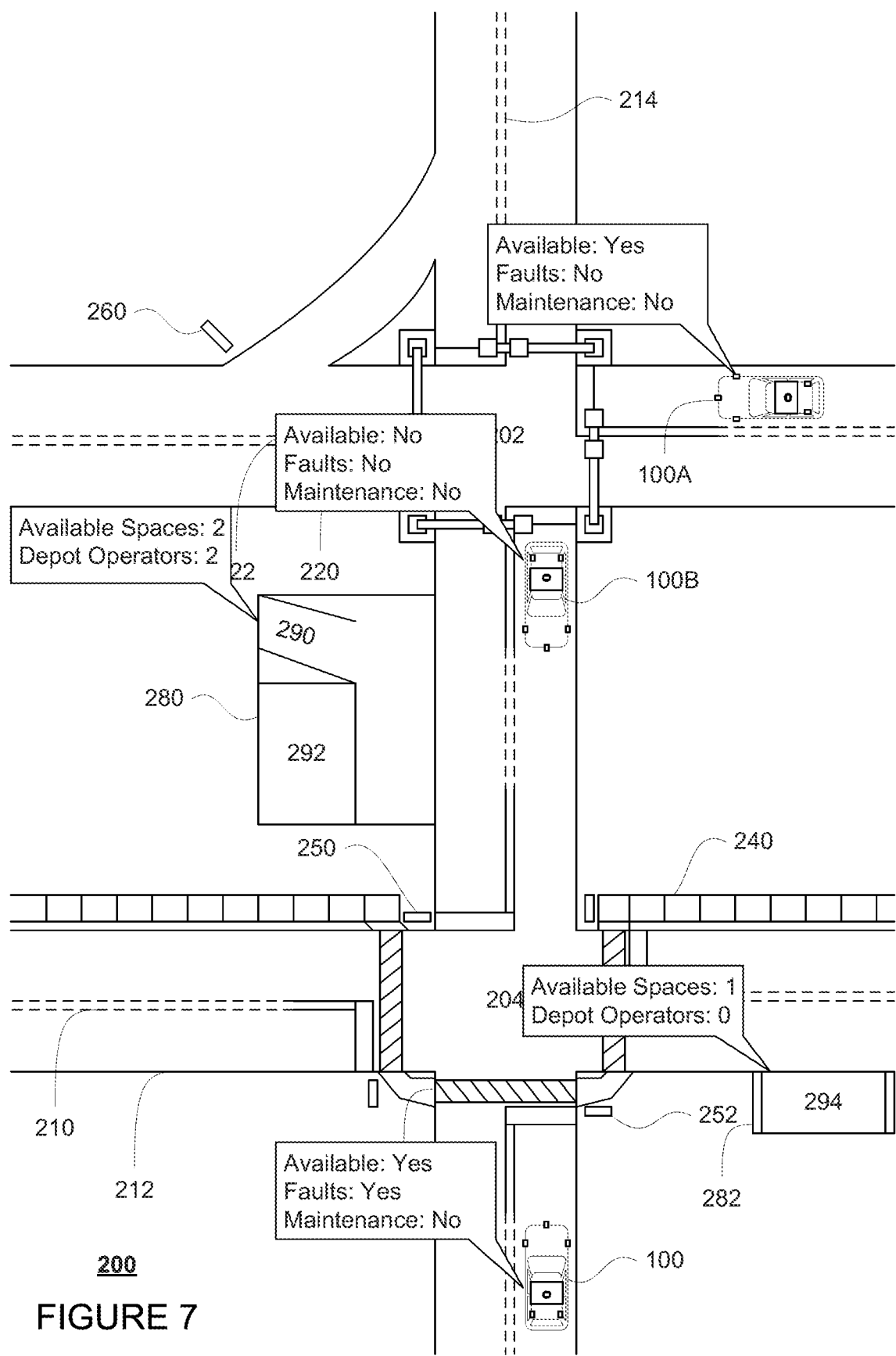
FIG. 7 is an example representation of data in accordance with aspects of the disclosure.

Each vehicle may periodically or constantly provide status reports to the dispatching system using network 460. FIG. 7 depicts an example of the information tracked by the dispatching system overlaid on the map information 200. For instance, each of vehicles 100, 100A, and 100B may report that its location as well as other status information. In this example, Vehicle 100 is reporting a system fault at one of its sensors, and does not include any passengers. Vehicle 100A is occupied or providing transportation services to passengers. Vehicle 100B is available to provide transportation services (i.e. is not on it's way to pickup or drop off passengers or cargo).

The dispatching system 410 may use these status reports to update the storage system 450. Thus, the dispatching system 410 may track the status of each vehicle over time. In addition to using the status reports, the dispatching 410 may also track information such as the number of hours each vehicle has been in service or out of service, the number of hours since the vehicle was inspected, the number of hours since the vehicle's sensors were calibrated, and so on. As noted above, FIG. 8A is an example table 800A for tracking the status of the vehicles of the fleet. As can be seen, table 800a includes the most up to date information available to the dispatching system for vehicles 100, 100A, and 100B.

In addition to the status of the vehicles, the dispatching system may also track the status of the parking locations. This may include, for instance, the number of available parking spaces, the number of parking location operators on duty, as well as available services, such as a number of available refueling stations (for gas or electric charge), maintenance bays, etc. For instance, in FIG. 7, parking location 280 currently has 2 available parking spots and 2 parking location operators on duty, while parking location 282, a staging pad location, currently has 1 available parking spot and no parking location operator on duty. As noted above, FIG. 8A is an example table 800A for tracking the status of the vehicles of the fleet. As can be seen, table 800B includes the most up to date information available to the dispatching system for parking locations 280 and 282.

In response to the request for a vehicle, the dispatching system may identify an available vehicle of the fleet and assign that vehicle to the user, now a passenger. In the example of FIG. 7, only vehicle 100B is available and may be assigned in response to the request. However, the dispatching system 410 may assign vehicles based on proximity to the passenger's pick up location in time or distance, availability of vehicles, location of future expected trips for a vehicle relative to the passenger's destination, location of other users requesting trips to the same or nearby destinations (for ridesharing), etc. In this regard, as noted above, the dispatching 410 may track the total number and location of vehicles of the fleet, which and the total number of those vehicles that are "in service" or available to pickup passengers, as well as which and the total number of vehicles that are currently providing ride services (on the way to pick up a passenger or cargo and/or transporting passenger(s) or cargo to a destination).

Once a vehicle, such as vehicle 100B, is assigned to a trip, the dispatching system 410 may send dispatch instructions to the vehicle. These instructions may identify a pickup location, a destination location, as well as authentication information for authenticating the client computing device of the user. The dispatching system 410 may also update the status of vehicle 100B in the storage system 450. For instance, table 900A of FIG. 9A provides updated information for vehicle 100B as compared to table 800A.

When a vehicle is reporting a fault or service need, the dispatching system 410 may assign that vehicle to the closest parking location available which meets the needs of that vehicle. Once assigned, the dispatching system 410 may send instructions to that vehicle to proceed to the assigned parking location, and the vehicle's computing devices may control the vehicle accordingly. For instance, vehicle 100 is reporting a fault, for instance, an overheating sensor of the vehicle's perception system 172. The dispatching system 410 may identify parking location 280 as the closest parking location which can provide the vehicle 100 with shade. As such, the dispatching system 410 may assign vehicle 100 to parking location 280, and send instructions to vehicle 100, for instance using network 460, to proceed directly to parking location 280. The computing device 110 of vehicle 100 may receive the instructions and reroute the vehicle to parking location 280.

If the vehicle reporting a fault or service need and is currently transporting one or more passengers and/or cargo, the vehicle may be instructed to drop off the one or more passengers and/or cargo before proceeding to the parking location. Thus, the vehicle would proceed to its assigned parking location when empty of passengers and/or cargo. If the fault is severe, such as where the vehicle cannot proceed safely, another vehicle may be assigned to meet the vehicle, and a parking location operator may be sent to meet the vehicle and address the fault at the location where the vehicle was stopped, or to bring the vehicle back to a parking location.

Figure 10:
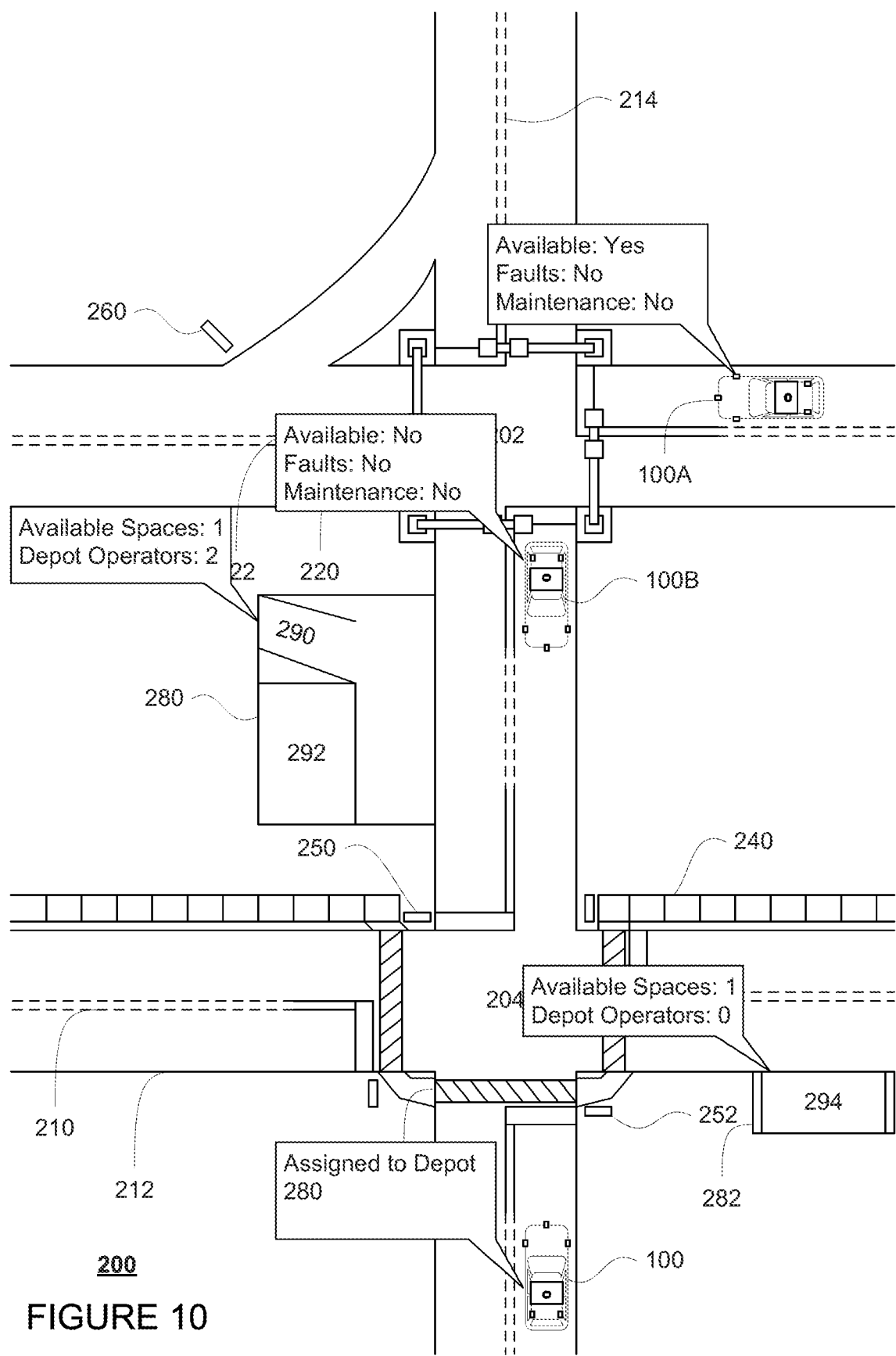
FIG. 10 is an example representation of data in accordance with aspects of the disclosure.

When assigning a vehicle to a parking location, the dispatching system may create a "work order" to be sent to the parking location to inform the parking location operators of the needs of the vehicle. In the example of vehicle 100, a work order may be generated and sent to parking location work station 440. The dispatching system 410 may update the storage system 450 such that number of available spaces at the assigned parking location to include one less. For instance, the dispatching system 410 has assigned vehicle 100 to parking location 280, the dispatching system may update the number of available parking spots of parking location 280 from 2 to 1 as shown in example table 900B of FIG. 9B. Turning to FIG. 10, vehicle 100 is now assigned to parking location 280 and parking location 280 now has 1 available parking space. This may be the case even though vehicle 100 has yet to reach parking location 280. This process may be performed for any vehicles requiring maintenance and assigned parking locations.

At the same time, for all other vehicles of the fleet not already dispatched to a particular parking location or already at a parking location, the dispatching system 410 may determine where those vehicles should go in the event the fleet is grounded. In this regard, the dispatching system may determine a subset of the fleet of vehicles that are not already assigned to a parking location. Returning to FIGS. 9A-10, vehicle 100 is already assigned to parking location 280, so the dispatching system 410 must determine where vehicles 100A and 100B should go in the event the fleet is grounded.

For the vehicles of the subset, the dispatching system 410 may iterate through different arrangements of vehicles, for instance assigning one or more different vehicles to different parking locations. In the example of FIGS. 9A and 9B, for simplicity, there are only two possible assignments. In a first assignment, vehicle 100A may be assigned to parking location 280 and vehicle 100B may be assigned to parking location 282. In a second assignment, vehicle 100A may be assigned to parking location 282 and vehicle 100B may be assigned to parking location 280.

For each assignment of the subset, a cost may be determined by examining a number of different factors including how quickly the remaining vehicles of the fleet can reach an assigned parking location (total time for all cars as well as the longest time), how long it takes each vehicle to park (total time for all cars), how many spaces are available at each parking location, whether vehicles will reach a parking location at a rate that is greater than the bandwidth of the parking location, and whether sending the vehicles to certain parking locations will cause congestion issues (i.e. traffic jams).

Each of these factors may be assigned a cost. For example, a cost may be assigned for each of a total time for all vehicles of the fleet to reach the assigned parking locations, a total time for all vehicles to park at the assigned parking locations, a number of available spaces at each parking location, the bandwidth of each parking location, and congestion issues. In the example of FIGS. 9A and 9B, for a given assignment, the dispatching system 410 may determine a total amount of time for vehicles 100A and 100B to reach an assigned parking location, this total amount of time may be converted to a cost.

For instance, it may take vehicles 100A and 100B 2 minutes to reach the assigned parking locations for the first assignment, and 5 minutes to reach the assigned parking locations for the second assignment. The second assignment may be longer because vehicle 100B may be traveling too fast to turn into parking location 280 and may need to make a U-turn or drive around the block to reach parking location 280. These values may each be converted for individual costs for the respective assignments. The costs can be on any scale and need not have a meaningful upper bound. For instance, the cost for vehicle A to reach parking location 280 may be "30" while the cost for vehicle 100B to reach parking location 280 may be "680." The total cost for vehicles to reach the parking location locations may be a simple sum of these values or "710."

In addition, a total time for the vehicles to park at the parking locations may also be determined and converted to a cost. In the example of FIGS. 9A and 9B, the time to park may be approximately the same. For instance, it may take the vehicles 10 seconds to park at parking location 282 and 40 seconds to park at parking location 280 given the nature of these locations. For instance, this may vary given the number of human operators (when human operators are taking in vehicles), traffic congestion, having to wait for other vehicles to move, the physical arrangement of parking spots, etc.

As another example, the number of parking spots and bandwidth may be determined and converted to a cost. For instance, a cost to each parking location may be determined for reducing the bandwidth of the parking location and number of available spaces at the parking location for each additional vehicle sent to that parking location. An example of this is discussed further below. Turning to the congestion example, because the dispatching system has access to the same maps used by the vehicles to determine how to navigate between two locations, the dispatching system may determine (without actually communicating with the vehicles) what route each vehicle will take to reach a location. The routes of all of the vehicles may be compared to determine costs of individual road segments of each route. Each segment may be assigned a cost based on the number of vehicles that will pass through that segment (during the grounding or at any given span of time during the grounding). These costs may increase non-linearly for each additional vehicle. In other words, the costs for 4 vehicles on one segment would be more than double the cost for 2 vehicles on that same segment.

Using these individual costs for each factor, an overall or total cost, for instance by summing all of the individual costs. As an example, the individual costs may be simply added together as a simple sum or a weighted sum where different factors may be weighed differently depending on importance. The iterations may be differentiated by adjusting the assignments for one or more vehicles which contributed the greatest costs to the total costs of the previous iteration. The iterations may continue until the costs can no longer be reduced (i.e. the next iteration increases the overall cost) or until the total cost meets, for instance, is less than or equal to a threshold value. This threshold value may correspond to an acceptable total cost which may be determined based on the total number of vehicles to be assigned at any given time, current traffic conditions, current demand for transportation services, etc.

The iteration associated with the lowest total cost or that meets the threshold value may be selected and used to assign the vehicles to the parking locations. These assignments may then be broadcast to all vehicles in the fleet or sent as individual instructions to each vehicle. In some instances, the assignments may include a set of directions (navigation instructions) for the vehicles to reach the assigned parking locations.

Using a simple example, assuming infinite capacity and bandwidth as well as no congestion (or simply ignoring these factors) and relying only on distance to the parking locations, both 100A and 100B might be assigned to parking location 280. However, considering bandwidth and capacity, if parking location 280 already has 40 parked cars and parking location 282 is nearly empty, the added cost of the reduced bandwidth and capacity of parking location 280 by sending both vehicles 100A and 100B to parking location 280, may cause vehicle 100A to be assigned to parking location 282 instead of parking location 280 as this assignment may have a lower overall cost. At the same time, for vehicle 100B, the added cost of the reduced bandwidth and capacity of parking location 280 may not enough to make the overall cost of the assignment too high, and vehicle 100B may still be assigned to parking location 280. Again, each of the costs discussed above, including for instance, distance, time to reach the parking locations, time to park at the parking locations, congestion, capacity and bandwidth, and others, may be used to determine the overall cost of each assignment and identify the lowest cost assignment In some examples, the individual costs may be adjusted. For instance, if the congestion or bandwidth costs are high, the dispatching system may attempt to adjust these costs in the next iteration by incorporating specific routes of the vehicles to adjust the congestion at different locations or to adjust the rate at which vehicles reach a parking location. This may be achieved by having certain vehicles drive in "circles" or loops or even following longer routes before reaching the parking location according to the sets of directions for these vehicles. Of course, when the dispatching system is considering the assignment of individual vehicles based on the status reports or other tracked information, the dispatching system, does not need to take into consideration the congestion costs.

The assignment of vehicles may be performed periodically and new parking location locations set to each vehicle in the fleet. As an example, this may be several times per second or more or less. This may provide a more robust system where all vehicles are constantly updated with the best parking location in the event of a grounding of the fleet given their current location and status of the parking locations.

In addition to assigning vehicles to parking locations, the dispatching system may also set rules or requirements for the entire fleet (i.e. all vehicles are grounded) or for specific vehicles. For instance, it may become necessary to restrict driving on highways or high speed roads when it is raining or about to rain. Another example of such requirements may be that all vehicles that are still on an older software or map version should return to parking location or avoid highways, steep hills, specific weather conditions, etc. In another example, vehicles without a specific type of sensor in a particular geographic area should pull over for the duration of a storm, such as snow, rain, dust, etc. Other examples may include restricting vehicles with certain hardware or software versions from performing transportation services to passengers or driving autonomously on public roads, or restricting vehicles from driving autonomously without a passenger able to act as a driver or test driver unless such vehicles have passed automated sensor tests with the results within a precisely defined threshold within a predetermined number of days, for instance within the last week.

The responses or behaviors that should apply to these requirements may vary based on the proscribed situation (physical location, weather condition, etc.). These behaviors may include having a vehicle: (1) Stop as soon as possible (even potentially in lane); (2) Attempt to exit this environment or area within some time limit., and if this is not possible, stop (either in lane or pullover); (3) Exit this environment as quickly as possible, or (4) Continue according to normal operation (i.e. without making changes). In addition, behaviors (1)-(3) may also have corresponding impacts upon a vehicle which is not in the proscribed situation but which might be about to enter the situation. In such a case, (1) might involve stopping and/or pulling the vehicle over before entering a particular area or environment, while (2) or (3) may allow some brief time in that environment.

While the requirements may be sent to only the vehicles which would be subject to those requirements, alternatively, the requirements may be sent to all vehicles in the fleet. In this way, each individual vehicle's computing devices may be tasked with determining whether the requirements apply to that vehicle.

In some instances, the dispatching system may also control the number of vehicles in service. This may be done according to expected or actual demand for the vehicles of the fleet, as well as any of the features described above. For instance, the dispatching system may send certain vehicles to the "staging pad" locations when demand is or is expected to be high in the area, etc.

Figure 11:
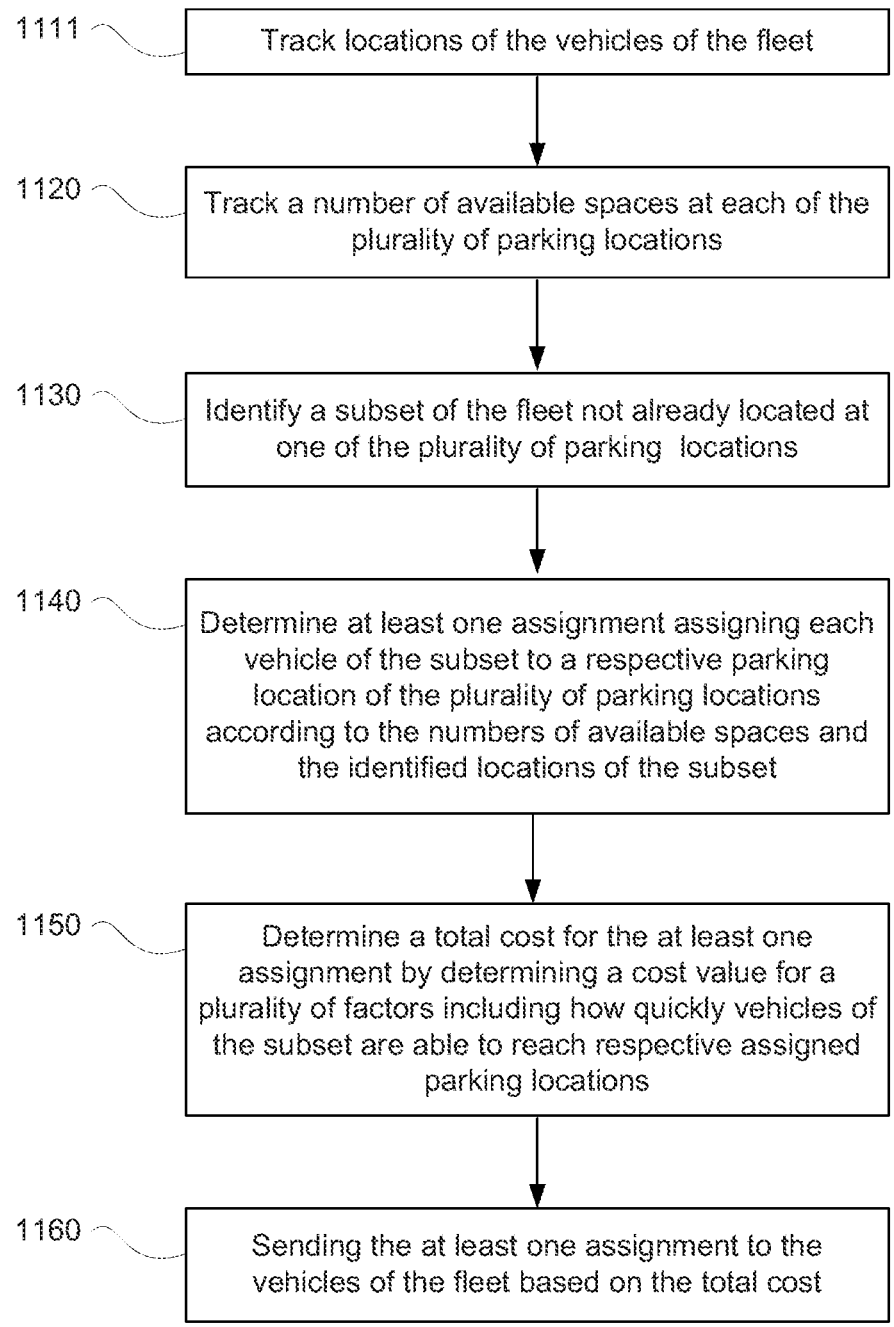
FIG. 11 is an example flow diagram in accordance with aspects of the disclosure.

FIG. 11 includes an example flow diagram 800 of some of the examples for assigning a fleet of driverless vehicles to a plurality of parking location locations for parking vehicles of the fleet as discussed above. In this example, the steps of flow diagram may be performed by one or more processors of one or more computing devices, such as processors of dispatching system 410. At block 1110, locations of the vehicles of the fleet are tracked. At block 1120, a number of available spaces at each of the plurality of parking locations is tracked. At block 1130, a subset of the fleet not already located at one of the plurality of parking location locations is identified. At block 1140, at least one assignment assigning each vehicle of the subset to a respective parking location of the plurality of parking locations according to the numbers of available spaces and the identified locations of the subset. At block 1150, a total cost for the at least one assignment is is determined by determining a cost value for a plurality of factors including how quickly vehicles of the subset are able to reach respective assigned parking location locations. At block 1160, the at least one assignment is sent to the fleet based on the total cost.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method of assigning a fleet of driverless vehicles to a plurality of parking locations for parking vehicles, wherein each location of the plurality of parking locations is associated with a set of service capabilities, the method comprising:
   identifying, by one or more processors, locations of the vehicles of the fleet;
   identifying, by the one or more processors, a number of available spaces at each of the plurality of parking locations;
   identifying, by the one or more processors, a subset of the vehicles of the fleet not already located at one of the plurality of parking locations;
   identifying, by the one or more processors, a first vehicle of the subset in need of a first service;
   assigning the first vehicle to a first location of the plurality of parking locations based on the first service and the set of service capabilities associated with the first location;
   after assigning the first vehicle, removing the first vehicle from the subset;
   determining, by the one or more processors, at least one assignment assigning each vehicle of the subset to a respective assigned parking location of the plurality of parking locations based on the numbers of available spaces and the identified locations of the subset; and
   sending, by the one or more processors, the at least one assignment to the fleet.

2. The method of claim 1, further comprising, determining a total cost for the at least one assignment by determining a cost value for each of a plurality of factors, and wherein sending the at least one assignment is based on the total cost.

3. The method of claim 1, wherein the first service includes a maintenance service.

4. The method of claim 1, wherein the first service includes a cleaning service.

5. The method of claim 1, wherein the first service includes refueling.

6. The method of claim 1, wherein the first service includes recharging.

7. The method of claim 1, further comprising, receiving, from the first vehicle, information identifying a service status of that vehicle, and wherein identifying the first vehicle is further based on the received information.

8. The method of claim 1, further comprising sending an instruction to the fleet, after sending the at least one assignment, thereby causing all vehicles of the subset to travel to a corresponding respective assigned parking location according to the at least one assignment.

9. The method of claim 1, further comprising, receiving from each vehicle of the fleet, a periodic broadcast identifying a status of the vehicle, wherein identifying the first vehicle is further based on the periodic broadcast received from the first vehicle.

10. The method of claim 9, further comprising, after assigning the first vehicle to the first location, adjusting the number of available parking spaces at the first location.

11. The method of claim 1, further comprising, sending a set of navigation instruction for each vehicle of the subset to maneuver to a corresponding respective assigned parking location according to the at least one assignment.

12. A system for assigning a fleet of driverless vehicles to a plurality of parking locations for parking vehicles of the fleet, wherein each location of the plurality of parking locations is associated with a set of service capabilities, the system comprising one or more processors configured to:
identify locations of the vehicles of the fleet;
identify a number of available spaces at each of the plurality of parking locations;
identify a subset of the vehicles of the fleet not already located at one of the plurality of parking locations;
identify a first vehicle of the subset in need of a first service;
assigning the first vehicle to a first location of the plurality of parking locations based on the first service and the set of service capabilities associated with the first location;
after assigning the first vehicle, remove the first vehicle from the subset;
determine at least one assignment assigning each vehicle of the subset to a respective assigned parking location of the plurality of parking locations based on the numbers of available spaces and the identified locations of the subset; and
send the at least one assignment to the fleet.

13. The system of claim 12, wherein the one or more processors are further configured to determine a total cost for the at least one assignment by determining a cost value for each of a plurality of factors, and to send the at least one assignment further based on the total cost.

14. The system of claim 12, wherein the first service includes refueling.

15. The system of claim 12, wherein the first service includes recharging.

16. The system of claim 12, wherein the one or more processors are further configured to receive from the first vehicle information identifying a service status of that vehicle, and to identify the first vehicle further based on the received information.

17. The system of claim 12, wherein the one or more processors are further configured to send an instruction to the fleet, after sending the at least one assignment, in order to cause all vehicles of the subset to travel to a corresponding respective assigned parking location according to the at least one assignment.

18. The system of claim 12, wherein the one or more processors are further configured to receive from each vehicle of the fleet a periodic broadcast identifying a status of the vehicle, and to identify the first vehicle further based on the periodic broadcast received from the first vehicle.

19. The system of claim 18, wherein the one or more processors are further configured to, after assigning the first vehicle to the first location, adjust the number of available parking spaces at the first location.

20. The system of claim 12, wherein the one or more processors are further configured to send a set of navigation instruction for each vehicle of the subset to maneuver to a corresponding respective assigned parking location according to the at least one assignment.

* * * * *